United States Patent
Yin et al.

(10) Patent No.: US 10,334,576 B2
(45) Date of Patent: Jun. 25, 2019

(54) SYSTEMS AND METHODS FOR UPLINK CONTROL INFORMATION REPORTING WITH LICENSE-ASSISTED ACCESS (LAA) UPLINK TRANSMISSIONS

(71) Applicant: Sharp Kabushiki Kaisha, Sakai-ku, Sakai, Osaka (JP)

(72) Inventors: Zhanping Yin, Vancouver, WA (US); Toshizo Nogami, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 16/006,590

(22) Filed: Jun. 12, 2018

(65) Prior Publication Data
US 2018/0295615 A1    Oct. 11, 2018

Related U.S. Application Data

(63) Continuation of application No. 15/348,373, filed on Nov. 10, 2016, now abandoned.
(Continued)

(51) Int. Cl.
*H04W 72/04* (2009.01)
*H04L 1/18* (2006.01)
(Continued)

(52) U.S. Cl.
CPC ....... *H04W 72/0413* (2013.01); *H04L 1/1671* (2013.01); *H04L 1/1861* (2013.01);
(Continued)

(58) Field of Classification Search
CPC ..... H04L 1/1671; H04L 1/1861; H04L 5/001; H04L 5/0051; H04L 5/0053; H04L 5/0055; H04L 5/0057
See application file for complete search history.

(56) References Cited

U.S. PATENT DOCUMENTS

| 2012/0250631 A1 | 10/2012 | Hakola et al. |
| 2013/0044685 A1 | 2/2013 | Fong et al. |

(Continued)

FOREIGN PATENT DOCUMENTS

| WO | 2015042396 A1 | 3/2015 |
| WO | 2015050743 A1 | 4/2015 |

(Continued)

OTHER PUBLICATIONS

Huawei, HiSilicon, "UL LBT for LAA," 3GPP TSG RAN WG1 Meeting #82bis, R1-155099, Oct. 9, 2015.
(Continued)

*Primary Examiner* — Mewale A Ambaye
(74) *Attorney, Agent, or Firm* — Austin Rapp

(57) ABSTRACT

A user equipment (UE) for reporting uplink control information (UCI) when one or more Licensed-Assisted Access (LAA) serving cells are configured is described. The UE includes a processor and memory in electronic communication with the processor. Instructions stored in the memory are executable to determine if physical uplink shared channel (PUSCH) transmissions are scheduled on LAA serving cells and licensed cells. The instructions are also executable to determine a type of UCI to be reported. The instructions are further executable to determine a channel and cells to carry different UCI. The instructions are additionally executable to transmit the channel on the cells determined to carry UCI. The instructions are also executable to determine whether a LAA PUSCH is transmitted and UCI is multiplexed. The instructions are further executable to drop LAA PUSCH or transmit LAA PUSCH subject to listen-before-talk (LBT).

4 Claims, 9 Drawing Sheets

Related U.S. Application Data

(60) Provisional application No. 62/254,083, filed on Nov. 11, 2015.

(51) Int. Cl.
  *H04W 74/08* (2009.01)
  *H04L 5/00* (2006.01)
  *H04L 1/16* (2006.01)

(52) U.S. Cl.
  CPC ............ *H04L 5/001* (2013.01); *H04L 5/0053* (2013.01); *H04W 74/0808* (2013.01); *H04L 5/0051* (2013.01); *H04L 5/0055* (2013.01); *H04L 5/0057* (2013.01)

(56) References Cited

U.S. PATENT DOCUMENTS

| | | | |
|---|---|---|---|
| 2014/0153452 A1* | 6/2014 | Son | H04L 5/001 370/280 |
| 2014/0362780 A1 | 12/2014 | Malladi et al. | |
| 2015/0049712 A1 | 2/2015 | Chen et al. | |
| 2015/0172950 A1 | 6/2015 | Chen et al. | |
| 2017/0332374 A1* | 11/2017 | Koorapaty | H04L 1/0009 |
| 2018/0205526 A1* | 7/2018 | Kim | H04J 11/00 |
| 2018/0249339 A1* | 8/2018 | Noh | H04L 5/0051 |
| 2018/0255566 A1* | 9/2018 | Takeda | H04L 5/001 |

FOREIGN PATENT DOCUMENTS

| | | |
|---|---|---|
| WO | 2015116503 A1 | 8/2015 |
| WO | 2015131806 A1 | 9/2015 |

OTHER PUBLICATIONS

Fujitsu, "Evaluation of some sensing options for UL LBT," 3GPP TSG RAN WG1 Meeting #82bis, R1-155155, Oct. 9, 2015.
CATT, "UL LBT framework for LAA," 3GPP TSG RAN WG1 Meeting #82bis, R1-155191, Oct. 9, 2015.
ZTE, "UL framework for LAA," 3GPP TSG RAN WG1 Meeting #82bis, R1-155245, Oct. 9, 2015.
Intel Corporation, "UL LBT for self-carrier scheduling," 3GPP TSG RAN WG1 Meeting #82bis, R1-155312, Oct. 9, 2015.
Panasonic, "Discussion on UL scheduling and transmission," 3GPP TSG RAN WG1 Meeting #82bis, R1-155350, Oct. 9, 2015.
LG Electronics, "UL LBT design in LAA," 3GPP TSG RAN WG1 Meeting #82bis, R1-155386, Oct. 9, 2015.
Samsung, "Discussion on LBT for UL transmission," 3GPP TSG RAN WG1 Meeting #82bis, R1-155461, Oct. 9, 2015.
Broadcom Corporation, "Further Discussion on LAA UL LBT Design," 3GPP TSG RAN WG1 Meeting #82bis, R1-155549, Oct. 9, 2015.
Qualcomm Incorporated, "Remaining details of UL LBT operation," 3GPP TSG RAN WG1 Meeting #82bis, R1-155722, Oct. 9, 2015.
CMCC, "Discussion on issues related to UL channel access for LAA," 3GPP TSG RAN WG1 Meeting #82bis, R1-155785, Oct. 9, 2015.
Motorola Mobility, "UL Channel Access for LAA," 3GPP TSG RAN WG1 Meeting #82bis, R1-155943, Oct. 9, 2015.
3GPP TS 36.213 V12.7.0, Evolved Universal Terrestrial Radio Access (E-UTRA); Physical layer procedures (Release 12) Sep. 2015.
3GPP TS 36.212 V12.6.0, Evolved Universal Terrestrial Radio Access (E-UTRA); Multiplexing and channel coding (Release 12) Sep. 2015.
ZTE, "Overview on LAA UL", 3GPP TSG RAN WG1 Meeting #81, R1-152970, May 29, 2015.
ZTE, "UL framework for LAA", 3GPP TSG RAN WG1 Meeting #83, R1-156994, Nov. 22, 2015.
Nokia Networks, "On the remaining PHY issues for LAA UL operation," 3GPP TSG RAN WG1 Meeting #81, R1-152816, May 29, 2015.
Alcatel-Lucent, Alcatel-Lucent Shanghai Bell, "Control Signaling for LAA," 3GPP TSG RAN WG1 Meeting #81, R1-152995, May 29, 2015.
Search Report and Written Opinion issued for International Application No. PCT/US2016/061533 dated Jan. 25, 2017.
Office Action issued for U.S. Appl. No. 15/348,373 dated Nov. 3, 2017.
ZTE, "UL framework for LAA", 3GPP TSG RAN WG1 Meeting #83, Anaheim, USA, R1-156994, Nov. 22, 2015.
Alcatel-Lucent, Alcatel-Lucent Shanghai Bell, "Control Signaling for LAA," 3GPP TSG RAN WG1 Meeting #81, Fukuoka, Japan, R1-152995, May 29, 2015.

* cited by examiner

SYSTEMS AND METHODS FOR UPLINK CONTROL INFORMATION REPORTING WITH LICENSE-ASSISTED ACCESS (LAA) UPLINK TRANSMISSIONS

RELATED APPLICATIONS

This application is a continuation of U.S. patent application Ser. No. 15/348,373 entitled "SYSTEMS AND METHODS FOR UPLINK CONTROL INFORMATION REPORTING WITH LICENSE-ASSISTED ACCESS (LAA) UPLINK TRANSMISSIONS," filed Nov. 10, 2016, which is related to and claims priority from U.S. Provisional Patent Application No. 62/254,083, entitled "SYSTEMS AND METHODS FOR UPLINK CONTROL INFORMATION REPORTING WITH LICENSE-ASSISTED ACCESS (LAA) UPLINK TRANSMISSIONS," filed on Nov. 11, 2015, which are all hereby incorporated by reference herein, in their entirety.

TECHNICAL FIELD

The present disclosure relates generally to communication systems. More specifically, the present disclosure relates to systems and methods for uplink control information (UCI) reporting with license-assisted access (LAA) uplink transmissions.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

DETAILED DESCRIPTION

Figure 1:
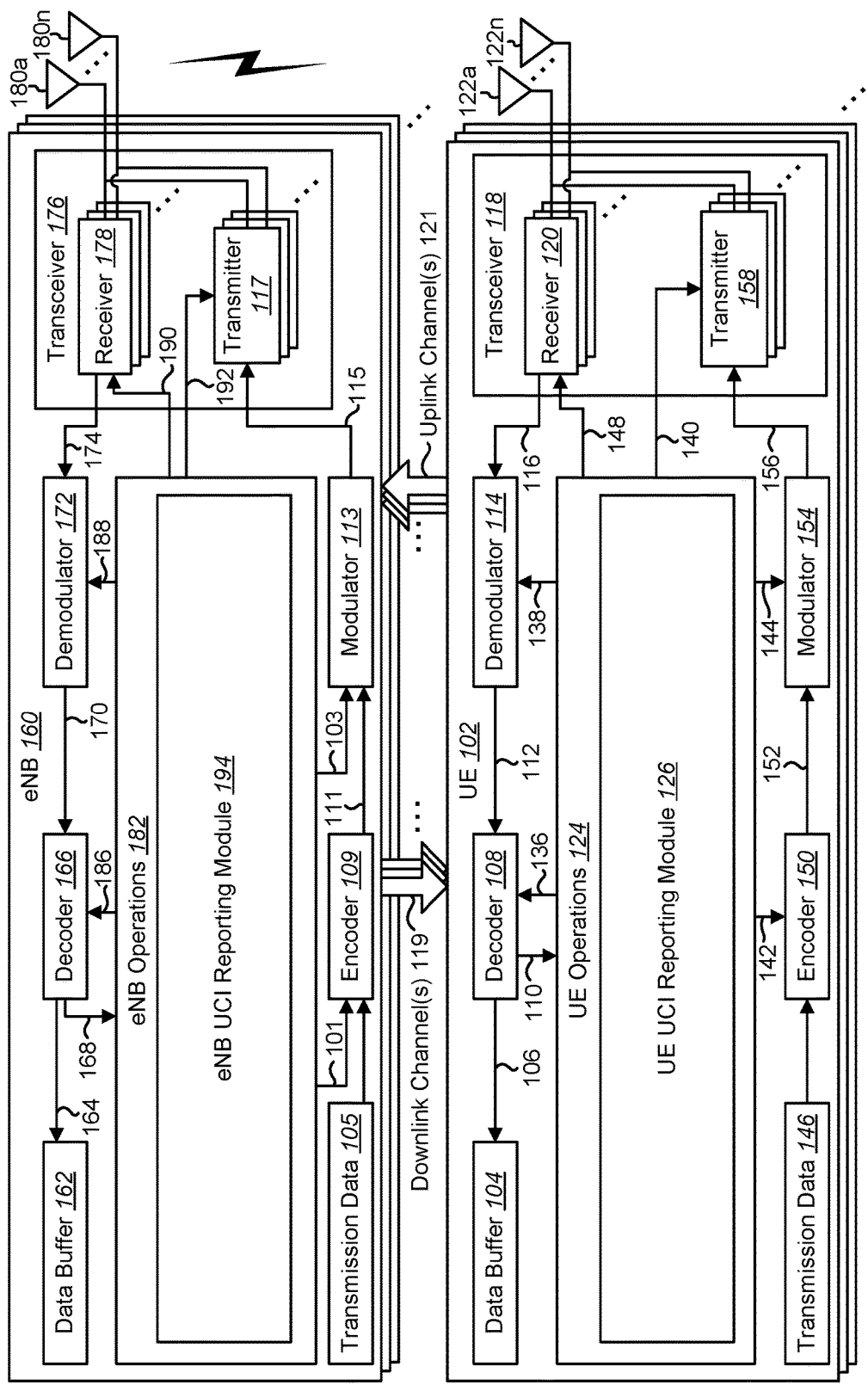
FIG. 1 is a block diagram illustrating one implementation of one or more evolved Node Bs (eNBs) and one or more user equipments (UEs) in which systems and methods for reporting uplink control information (UCI) with licensed-assisted access (LAA) may be implemented.

A user equipment (UE) for reporting uplink control information (UCI) when one or more Licensed-Assisted Access (LAA) serving cells are configured is described. The UE includes a processor and memory in electronic communication with the processor. Instructions stored in the memory are executable to determine if physical uplink shared channel (PUSCH) transmissions are scheduled on LAA serving cells and licensed cells. The instructions are also executable to determine a type of UCI to be reported. The instructions are further executable to determine a channel and cells to carry different UCI. The instructions are additionally executable to transmit the channel on the cells determined to carry UCI. The instructions are also executable to determine whether a LAA PUSCH is transmitted and UCI is multiplexed. The instructions are further executable to drop LAA PUSCH or transmit LAA PUSCH subject to listen-before-talk (LBT).

If PUSCH transmissions are scheduled on LAA serving cells and licensed cells, and the LAA cell has the lowest cell ID among all cells with scheduled PUSCH, then the instructions may be further executable to determine a licensed cell with the lowest Cell ID among all licensed cells with scheduled PUSCH transmissions. The instructions may be also executable to determine a type of UCI to be reported. The instructions may be additionally executable to determine reporting the UCI on physical uplink control channel (PUCCH) or the selected licensed cell PUSCH follow existing rules. The instructions may be also executable to transmit PUCCH and/or licensed PUSCH with UCI multiplexing as scheduled. The instructions may be further executable to transmit LAA PUSCH subject to LBT.

If PUSCH transmissions are scheduled only on LAA serving cells, then the instructions may be also executable to determine that the UCI includes hybrid automatic repeat request acknowledgement (HARQ-ACK) and/or scheduling request (SR) and/or periodic channel state information (P-CSI) only. The instructions may be further executable to determine a PUCCH resource and format for UCI reporting for PUCCH only reporting when there is no PUSCH transmission. The instructions may be additionally executable to transmit a PUCCH carrying HARQ-ACK and/or SR and/or P-CSI. The instructions may be also executable to determine if simultaneous PUCCH and PUSCH is configured. The instructions may be further executable to determine the LAA PUSCH transmission.

If simultaneous PUCCH and PUSCH is not configured, then the instructions may be further executable to drop a LAA PUSCH. If simultaneous PUCCH and PUSCH is configured, then the instructions may be further executable to transmit a LAA PUSCH subject to LBT.

If PUSCH transmissions are scheduled only on LAA serving cells, then the instructions may be also executable to determine that the UCI includes HARQ-ACK and/or SR and/or P-CSI and aperiodic CSI (A-CSI). The instructions may be further executable to determine a PUCCH resource and format for UCI reporting for PUCCH only reporting for HARQ-ACK and/or SR and/or P-CSI when there is no PUSCH transmission. The instructions may be additionally executable to transmit PUCCH carrying HARQ-ACK and/or SR and/or P-CSI. The instructions may be also executable to determine if simultaneous PUCCH and PUSCH is configured. The instructions may be further executable to determine a LAA PUSCH transmission.

If simultaneous PUCCH and PUSCH is not configured, then the instructions may be further executable to drop A-CSI and drop LAA PUSCH. If simultaneous PUCCH and PUSCH is not configured, then the instructions may be further executable to multiplex A-CSI on a LAA PUSCH and transmit a LAA PUSCH subject to LBT.

If both P-CSI and A-CSI are scheduled, and simultaneous PUCCH and PUSCH is configured, both P-CSI and A-CSI may be reported. The instructions may be further executable to transmit a PUCCH carrying P-CSI. The instructions may be additionally executable to multiplex A-CSI on LAA PUSCH. The instructions may be also executable to transmit the LAA PUSCH subject to LBT.

If PUSCH transmissions are scheduled only on LAA serving cells, then the instructions may be further executable to determine the UCI includes A-CSI only. The instructions may be additionally executable to multiplex A-CSI on LAA PUSCH. The instructions may be also executable to transmit LAA PUSCH subject to LBT.

If UCI is multiplexed on LAA PUSCH, then the instructions may be further executable to determine a set of control transmission offsets for LAA that is different from normal UL transmissions by higher layer signaling. The instructions may be additionally executable to determine a number of symbols for the UCI multiplexing on LAA PUSCH. The instructions may be also executable to multiplex control symbols on LAA PUSCH using only available OFDM symbols. The instructions may be further executable to transmit the LAA PUSCH with UCI multiplexing subject to LBT.

A method for reporting UCI when one or more LAA serving cells are configured is also described. The method includes determining if PUSCH transmissions are scheduled on LAA serving cells and licensed cells. The method also includes determining a type of UCI to be reported. The method further includes determining a channel and cells to carry different UCI. The method additionally includes transmitting the channel on the cells determined to carry UCI. The method also includes determining whether a LAA PUSCH is transmitted and UCI is multiplexed. The method further includes dropping LAA PUSCH or transmitting LAA PUSCH subject to LBT.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an eNB, a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may refer to any set of communication channels over which the protocols for communication between a UE and eNB that may be specified by standardization or governed by regulatory bodies to be used for International Mobile Telecommunications-Advanced (IMT-Advanced) or its extensions and all of it or a subset of it may be adopted by 3GPP as licensed bands (e.g., frequency bands) to be used for communication between an eNB and a UE. "Configured cells" are those cells of which the UE is aware and is allowed by an eNB to transmit or receive information. "Configured cell(s)" may be serving cell(s). The UE may receive system information and perform the required measurements on all configured cells. "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

The systems and methods disclosed may involve carrier aggregation. Carrier aggregation refers to the concurrent utilization of more than one carrier. In carrier aggregation, more than one cell may be aggregated to a UE. In one example, carrier aggregation may be used to increase the effective bandwidth available to a UE. The same TDD uplink-downlink (UL/DL) configuration has to be used for TDD carrier aggregation (CA) in Release-10, and for intra-band CA in Release-11. In Release-11, inter-band TDD CA with different TDD UL/DL configurations is supported. The inter-band TDD CA with different TDD UL/DL configurations may provide the flexibility of a TDD network in CA deployment. Furthermore, enhanced interference management with traffic adaptation (eIMTA) (also referred to as dynamic UL/DL reconfiguration) may allow flexible TDD UL/DL reconfiguration based on the network traffic load.

It should be noted that the term "concurrent" and variations thereof as used herein may denote that two or more events may overlap each other in time and/or may occur near in time to each other. Additionally, "concurrent" and variations thereof may or may not mean that two or more events occur at precisely the same time.

An FDD cell requires spectrum (e.g., radio communication frequencies or channels) in which contiguous subsets of the spectrum are entirely allocated to either UL or DL but not both. Accordingly, FDD may have carrier frequencies that are paired (e.g., paired DL and UL carrier frequencies). However, TDD does not require paired channels. Instead, TDD may allocate UL and DL resources on the same carrier frequency. Therefore, TDD may provide more flexibility on spectrum usage. With the increase in wireless network traffic, and as spectrum resources become very precious, new allocated spectrum tends to be fragmented and has smaller bandwidth, which is more suitable for TDD and/or small cell deployment. Furthermore, TDD may provide flexible channel usage through traffic adaptation with different TDD UL/DL configurations and dynamic UL/DL re-configuration.

Synchronization signals may be used to perform time and frequency synchronization of a serving cell carrier. The synchronization signals may include a primary synchronization signal (PSS) and a secondary synchronization signal (SSS). In a licensed LTE cell, the PSS and SSS broadcast periodically in fixed subframe indexes in the central 62 subcarriers of the carrier.

Licensed-assisted access (LAA) may support LTE in unlicensed spectrum. In a LAA network, the DL transmission may be scheduled in an opportunistic manner. For fairness utilization, a LAA eNB may perform functions such as clear channel assessment (CCA), listen before talk (LBT) and dynamic frequency selection (DFS). Thus, a LAA transmission may not guarantee a DL transmission in the fixed subframe location that contains the synchronization signals.

A long-term evolution (LTE) uplink (UL) transmission may be scheduled by an eNB with an uplink grant. An UL grant may be a downlink control information (DCI) format in a physical downlink control channel (PDCCH) or an enhanced (EPDCCH), or a physical hybrid ARQ indicator channel (PHICH) feedback. The time between a UL grant and the scheduled UL transmission may be at least 4 milliseconds (ms).

However, a LAA uplink needs to perform LBT, thus the scheduled uplink transmission cannot be guaranteed. Furthermore, a LAA uplink subframe may contain fewer orthogonal frequency division multiplexing (OFDM) symbols than a regular UL subframe on a licensed band to allocate sensing slots for LBT algorithms.

For uplink control information (UCI) reporting, several approaches are defined for carrier aggregation (CA) where more than one serving cells are configured. If there are one or more LAA cells configured as secondary cells (SCells), the UCI reporting procedures may be changed to avoid using uplink transmission on a LAA cell.

The systems and methods herein describe the specification changes to avoid a UCI reporting on a LAA cell. Furthermore, the systems and methods described herein provide approaches for UCI multiplexing on a LAA physical uplink shared channel (PUSCH) if UCI reporting on a LAA cell is supported.

An UL transmission may be scheduled by an eNB in advance with a UL grant, and should be transmitted in the scheduled subframe. A LAA UL transmission may be subject to CCA detection and listen-before-talk (LBT). If a UE detects the channel is occupied before the scheduled UL transmission, the UE may backoff the scheduled transmission.

For a physical uplink control channel (PUCCH) reporting, the UCI may be reported on a primary cell (PCell) only. Thus, there is no issue if LAA SCells are configured. However, for a UE with one or more LAA SCells configured, the UCI reporting procedure on PUSCH may be modified to avoid using LAA cells.

Therefore, considering different kinds of UCI types, for HARQ-ACK/scheduling request (SR) and periodic channel state information (P-CSI) (including channel quality indicator (CQI) and/or precoding matrix indicator (PMI) and/or rank indicator (RI)), if HARQ-ACK/SR/P-CSI is scheduled in a subframe where a LAA cell is the only cell with a PUSCH transmission, the CSI should be reported on the PUCCH of the PCell or primary secondary cell (pSCell).

Furthermore, if HARQ-ACK/SR/P-CSI is scheduled in a subframe where a LAA cell is the cell with lowest Cell ID and a PUSCH transmission, if the other cells with PUSCH are also LAA cells, the CSI should be reported on the PUCCH of the PCell or pSCell. If there is another licensed cell with PUSCH transmission, the UCI should be multiplexed on the licensed cell even if it has a higher Cell ID index.

More details are described herein considering different radio resource control (RRC) parameters, including simultaneous HARQ-ACK and CSI reporting, simultaneous PUCCH and PUSCH reporting.

For aperiodic CSI (A-CSI), the reporting cell may be determined by the triggering UL grant. Thus, if a LAA cell is scheduled to report A-CSI, the UE should perform LAA UL transmission subject to LBT. If the UE fails to obtain the channel at the given subframe with LBT, the A-CSI should be dropped. If the UE obtains the channel with LBT, the A-CSI should be reported on the LAA UL PUSCH. However, the beta offset values may be different from a regular UL subframe PUSCH transmission because the LAA UL subframe contains fewer OFDM symbols. Also, the rate matching methods may be adjusted according to the number of OFDM symbols on the LAA PUSCH transmission.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more eNBs 160 and one or more UEs 102 in which systems and methods for reporting uplink control information (UCI) with licensed-assisted access (LAA) may be implemented. The one or more UEs 102 communicate with one or more eNBs 160 using one or more antennas 122a-n. For example, a UE 102 transmits electromagnetic signals to the eNB 160 and receives electromagnetic signals from the eNB 160 using the one or more antennas 122a-n. The eNB 160 communicates with the UE 102 using one or more antennas 180a-n.

The UE 102 and the eNB 160 may use one or more channels 119, 121 to communicate with each other. For example, a UE 102 may transmit information or data to the eNB 160 using one or more uplink channels 121. Examples of uplink channels 121 include a PUCCH and a PUSCH, etc. The one or more eNBs 160 may also transmit information or data to the one or more UEs 102 using one or more downlink channels 119, for instance. Examples of downlink channels 119 include a PDCCH, a PDSCH, etc. Other kinds of channels may be used.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the eNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the eNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce one or more decoded signals 106, 110. For example, a first UE-decoded signal 106 may comprise received payload data, which may be stored in a data buffer 104. A second UE-decoded signal 110 may comprise overhead data and/or control data. For example, the second UE-decoded signal 110 may provide data that may be used by the UE operations module 124 to perform one or more operations.

As used herein, the term "module" may mean that a particular element or component may be implemented in hardware, software or a combination of hardware and software. However, it should be noted that any element denoted as a "module" herein may alternatively be implemented in hardware. For example, the UE operations module 124 may be implemented in hardware, software or a combination of both.

In general, the UE operations module 124 may enable the UE 102 to communicate with the one or more eNBs 160. The UE operations module 124 may include one or more of a UE UCI reporting module 126.

For a LAA transmission, the transmitter is required to perform clear channel assessment (CCA) detection and listen before talk (LBT). If the channel is occupied by other unlicensed signals, a LAA transmitter should defer the scheduled transmission and try again later.

For a LAA UE 102 to transmit a LAA UL subframe, the UL transmission has to be scheduled by a DL control signaling (e.g., PDCCH or EPDCCH with a DCI format) in an earlier subframe on either the same LAA cell with self-scheduling or on a licensed cell with cross-carrier scheduling. The minimum time interval between a UL grant in a DL signaling and the UL transmission is 4 ms. In TDD case, the association timing may be longer than 4 ms depending on the TDD UL/DL configuration and the scheduled UL subframe.

For a LAA eNB 160, if a subframe n on a LAA carrier is scheduled for UL transmission, the eNB 160 should not schedule any DL transmission on subframe n. Furthermore, there should be a minimum gap for CCA detection before the scheduled UL transmission. For example, the eNB 160 should not schedule PDSCH transmissions on all OFDM symbols of in the LAA cell subframe n−1. That is, the eNB 160 scheduler can avoid collision between a LAA DL and a LAA UL transmission in the same LAA cell.

For self-carrier scheduling, a CCA duration may be 25 microseconds (μs) before the transmission burst. The sensing duration can be less than the CCA duration. A category 4 LBT scheme may be used with a defer period of 25 μs including a defer duration of 16 μs followed by one CCA slot, and a maximum contention window size of X={13, 4, 5, 6, 7}, respectively. The UL maximum contention window size may be smaller than for DL category 4 LBT.

For cross-carrier scheduling, if it is supported that an LBT operation is performed on the SCell to send a grant on another Cell, the UL LBT procedure may be the same as that for self-carrier scheduling. For cross-carrier scheduling, when an LBT operation is not performed on the SCell, one or more of the following UL LBT procedures should be supported: (1) a CCA duration of at least 25 μs before the transmission burst; (2) the sensing duration can be less than the CCA duration; (3) A category 4 LBT scheme with a defer period of 25 μs including a defer duration of 16 us followed by one CCA slot.

Based on the above conditions, an UL LAA transmission may have several restrictions. Because LBT may be performed, the UL transmission is not guaranteed if the channel is occupied by other unlicensed transmissions. The UCI should be multiplexed on the PUSCH of the cell with lowest Cell ID, but if the cell is a LAA cell, the transmission cannot be guaranteed.

A single CCA of at least 25 μs can be used immediately before the UL transmission. Otherwise, if a category 4 LBT is applied, a contention window needs to be used for LBT. To provide contention access region for LBT, the LAA UL subframe may contain fewer OFDM symbols than a regular UL transmission.

In one approach, the LAA UL symbol may be transmitted at the subframe boundary. Thus, the last OFDM symbol of the previous subframe is punctured out to give space for LBT. Similarly, the last OFDM symbol of the UL subframe should be punctured to allocate LBT for the next subframe. If a category 4 LBT is applied, one OFDM symbol length provides approximately 7 CCA slots.

In another approach, the first OFDM symbol length of the scheduled UL subframe is reserved for LBT. If a category 4 LBT is applied, one OFDM symbol length provides approximately 7 CCA slots.

In yet another approach, both the first and the last OFDM symbols of a UL subframe are reserved for contention access. If a category 4 LBT is applied, one OFDM symbol length provides approximately 15 CCA slots.

Uplink control information (UCI) is important control information reported to eNB 160 from a UE 102. The UCI may include HARQ-ACK feedback for PDSCH transmissions. UCI may also include a scheduling request (SR) when a UE 102 has UL data and requests for eNB 160 to schedule a UL transmission. UCI may further include periodic channel state information (P-CSI), including CQI, PMI and RI, which is configured by the eNB 160 to report periodically. UCI may additionally include aperiodic channel state information (A-CSI), including CQI, PMI and RI, which is triggered by the eNB 160 to report CSI based on CSI request field.

In the UCI, HARQ-ACK and SR may have the highest priority. HARQ-ACK, SR and P-CSI may be reported on PUCCH or PUSCH depending on the scheduled transmissions and higher layer parameters. A-CSI may only be reported on a PUSCH transmission given by the UL grant with the CSI request.

The time and frequency resources that can be used by the UE 102 to report CSI may include channel quality indicator (CQI), precoding matrix indicator (PMI), precoding type indicator (PTI), and/or rank indication (RI). These are controlled by the eNB 160. For spatial multiplexing, the UE 102 may determine a RI corresponding to the number of useful transmission layers. For transmit diversity, RI may be equal to one.

As mentioned above, CSI reporting may be periodic or aperiodic. If the UE 102 is configured with more than one serving cell, the UE 102 transmits CSI for activated serving cell(s) only. If a UE 102 is not configured for simultaneous PUSCH and PUCCH transmission, the UE 102 may transmit periodic CSI reporting on PUCCH in subframes with no PUSCH allocation.

If a UE 102 is not configured for simultaneous PUSCH and PUCCH transmission, the UE 102 may transmit periodic CSI reporting on PUSCH of the serving cell with smallest ServCellIndex in subframes with a PUSCH allocation. The UE 102 may use the same PUCCH-based periodic CSI reporting format on PUSCH.

A UE 102 may transmit aperiodic CSI reporting on PUSCH if the conditions for A-CSI are met. For aperiodic CQI/PMI reporting, RI reporting is transmitted only if the configured CSI feedback type supports RI reporting.

In case both periodic and aperiodic CSI reporting would occur in the same subframe, the UE 102 may only transmit the aperiodic CSI report in that subframe. Thus, in a given subframe where there is no PUSCH scheduled and UCI is reported on PUCCH, the procedure as defined in the Release-10/11/12/13 may be used.

Physical uplink control channel procedures may be defined. If the UE 102 is configured with a secondary cell group (SCG), the UE 102 may apply the procedures described below for both a master cell group (MCG) and the SCG. When the procedures are applied for the MCG, the terms "secondary cell," "secondary cells," "serving cell," and "serving cells" may refer to the secondary cell, secondary cells, serving cell, serving cells belonging to the MCG respectively.

When the procedures are applied for SCG, the terms "secondary cell," "secondary cells," "serving cell," and "serving cells" may refer to the secondary cell, secondary cells (not including PSCell), serving cell, serving cells belonging to the SCG respectively. In this case, the term "primary cell" may refer to the PSCell of the SCG.

If the UE 102 is configured for a single serving cell and is not configured for simultaneous PUSCH and PUCCH transmissions, then in subframe n, uplink control information (UCI) may be transmitted on PUCCH using format 1/1a/1b/3 or 2/2a/2b if the UE 102 is not transmitting PUSCH. UCI may be transmitted on PUSCH if the UE 102 is transmitting PUSCH in subframe n unless the PUSCH transmission corresponds to a random access response grant or a retransmission of the same transport block as part of the contention based random access procedure, in which case UCI is not transmitted.

If the UE 102 is configured for a single serving cell and simultaneous PUSCH and PUCCH transmission, then in subframe n, UCI may be transmitted according to the following approaches. In one approach, UCI may be transmitted on PUCCH using format 1/1a/1b/3 if the UCI consists only of HARQ-ACK and/or SR. In another approach, UCI may be transmitted on PUCCH using format 2 if the UCI consists only of periodic CSI. In yet another approach, UCI may be transmitted on PUCCH using format 2/2a/2b/3 if the UCI consists of periodic CSI and HARQ-ACK and if the UE 102 is not transmitting PUSCH.

In another approach, UCI may be transmitted on PUCCH and PUSCH if the UCI consists of HARQ-ACK/HARQ-ACK+SR/positive SR and periodic/aperiodic CSI and if the UE 102 is transmitting PUSCH in subframe n. In this case, the HARQ-ACK/HARQ-ACK+SR/positive SR may be transmitted on PUCCH using format 1/1a/1b/3 and the periodic/aperiodic CSI may be transmitted on PUSCH unless the PUSCH transmission corresponds to a random access response grant or a retransmission of the same transport block as part of the contention based random access procedure, in which case periodic/aperiodic CSI is not transmitted.

If the UE 102 is configured with more than one serving cell and is not configured for simultaneous PUSCH and PUCCH transmission, then in subframe n, UCI may be transmitted according to the following approaches. In one approach, UCI may be transmitted on PUCCH using format 1/1a/1b/3 or 2/2a/2b if the UE 102 is not transmitting PUSCH. In another approach, UCI may be transmitted on a PUSCH of a serving cell if the UCI consists of aperiodic CSI or aperiodic CSI and HARQ-ACK.

In another approach, UCI may be transmitted on a primary cell PUSCH if the UCI consists of periodic CSI and/or HARQ-ACK and if the UE 102 is transmitting on the primary cell PUSCH in subframe n unless the primary cell PUSCH transmission corresponds to a random access response grant or a retransmission of the same transport block as part of the contention based random access procedure, in which case UCI is not transmitted.

In yet another approach, UCI may be transmitted on PUSCH of the secondary cell with smallest SCellIndex if the UCI consists of periodic CSI and/or HARQ-ACK and if the UE 102 is not transmitting PUSCH on the primary cell but is transmitting PUSCH on at least one secondary cell.

If the UE 102 is configured with more than one serving cell and simultaneous PUSCH and PUCCH transmission, then in subframe n, UCI may be transmitted to the following approaches. In one approach, UCI may be transmitted on PUCCH using format 1/1a/1b/3 if the UCI consists only of HARQ-ACK and/or SR. In another approach, UCI may be transmitted on PUCCH using format 2 if the UCI consists only of periodic CSI. In another approach, UCI may be transmitted on PUCCH using format 2/2a/2b/3, as described above, if the UCI consists of periodic CSI and HARQ-ACK and if the UE 102 is not transmitting on PUSCH.

In another approach, UCI may be transmitted on PUCCH and a primary cell PUSCH if the UCI consists of HARQ-ACK and periodic CSI and the UE 102 is transmitting PUSCH on the primary cell. In this case, the HARQ-ACK is transmitted on PUCCH using format 1a/1b/3 and the periodic CSI is transmitted on PUSCH unless the primary cell PUSCH transmission corresponds to a random access response grant or a retransmission of the same transport block as part of the contention based random access procedure, in which case periodic CSI is not transmitted.

In another approach, UCI may be transmitted on PUCCH and PUSCH of the secondary cell with the smallest SCellIndex if the UCI consists of HARQ-ACK and periodic CSI and if the UE 102 is not transmitting PUSCH on the primary cell but is transmitting PUSCH on at least one secondary cell, in which case, the HARQ-ACK is transmitted on PUCCH using format 1a/1b/3 and the periodic CSI is transmitted on PUSCH.

In yet another approach, UCI may be transmitted on PUCCH and PUSCH if the UCI consists of HARQ-ACK/HARQ-ACK+SR/positive SR and aperiodic CSI. In this case, the HARQ-ACK/HARQ-ACK+SR/positive SR is transmitted on PUCCH using format 1/1a/1b/3 and the aperiodic CSI is transmitted on a PUSCH of a serving cell.

If the UE 102 is configured with more than one serving cell, then reporting prioritization and collision handling of periodic CSI reports of a certain PUCCH reporting type may be performed as described above. In this case, a UE 102 may transmit PUCCH only on the primary cell.

In summary, the following reporting procedures may be defined for PUCCH-only reporting: HARQ-ACK and/or SR may be transmitted on PUCCH; P-CSI may be transmitted on PUCCH; and HARQ-ACK and/or SR and P-CSI may be transmitted in the same subframe. If simultaneous HARQ-ACK and CSI is configured, then HARQ-ACK and P-CSI may be transmitted on PUCCH. If simultaneous HARQ-ACK and P-CSI is not configured, then HARQ-ACK may be transmitted on PUCCH and P-CSI is dropped.

In a subframe where PUSCH is transmitted, the UCI may be reported on PUSCH or PUCCH depending on the configuration. If more than one PUSCH is scheduled in the subframe, the UCI is multiplexed on the PUSCH with the lowest cell index (Cell ID).

If simultaneous PUCCH and PUSCH transmission is not configured, the following reporting procedures may be defined: HARQ-ACK and/or SR may be transmitted on PUSCH; P-CSI may be transmitted on PUSCH; A-CSI may be transmitted on PUSCH; HARQ-ACK and/or SR and P-CSI may be transmitted on PUSCH; and HARQ-ACK and/or SR and A-CSI may be transmitted on PUSCH.

If simultaneous PUCCH and PUSCH transmission is configured, the following reporting procedures may be defined: HARQ-ACK and/or SR may be transmitted on PUCCH; HARQ-ACK and/or SR may be transmitted on PUCCH and P-CSI may be transmitted on PUSCH; HARQ-ACK and/or SR may be transmitted on PUCCH and A-CSI may be transmitted on PUSCH.

In both cases, if both P-CSI and A-CSI are scheduled in the same subframe, only A-CSI may be transmitted.

For UCI multiplexing on PUSCH, some modifications may be made to justify the unreliable LAA UL transmissions. In general, UCI reporting on LAA PUSCH is not desirable since a LAA PUSCH is subject to LBT and may not transmit as scheduled. This is especially significant for important UCI such as HARQ-ACK and SR. For periodic CSI, a dedicated PUCCH resource may be allocated. Thus, it is also better to use PUCCH instead of a LAA PUSCH for periodic CSI.

Therefore, some restrictions and UE 102 procedures may be specified to avoid transmitting UCI on a LAA cell if possible. In a first case (Case 1), PUSCH transmissions may be scheduled on both LAA and licensed cells, and the LAA cell has the lowest cell ID among all cells with scheduled PUSCH. With current specifications, the UCI may be carried on the LAA cell that has the lowest cell ID among all cells with scheduled PUSCH transmission. Due to unlicensed nature, LBT is required on each LAA cell. The LAA PUSCH with lowest cell ID is not guaranteed to get channel access.

Figure 3:
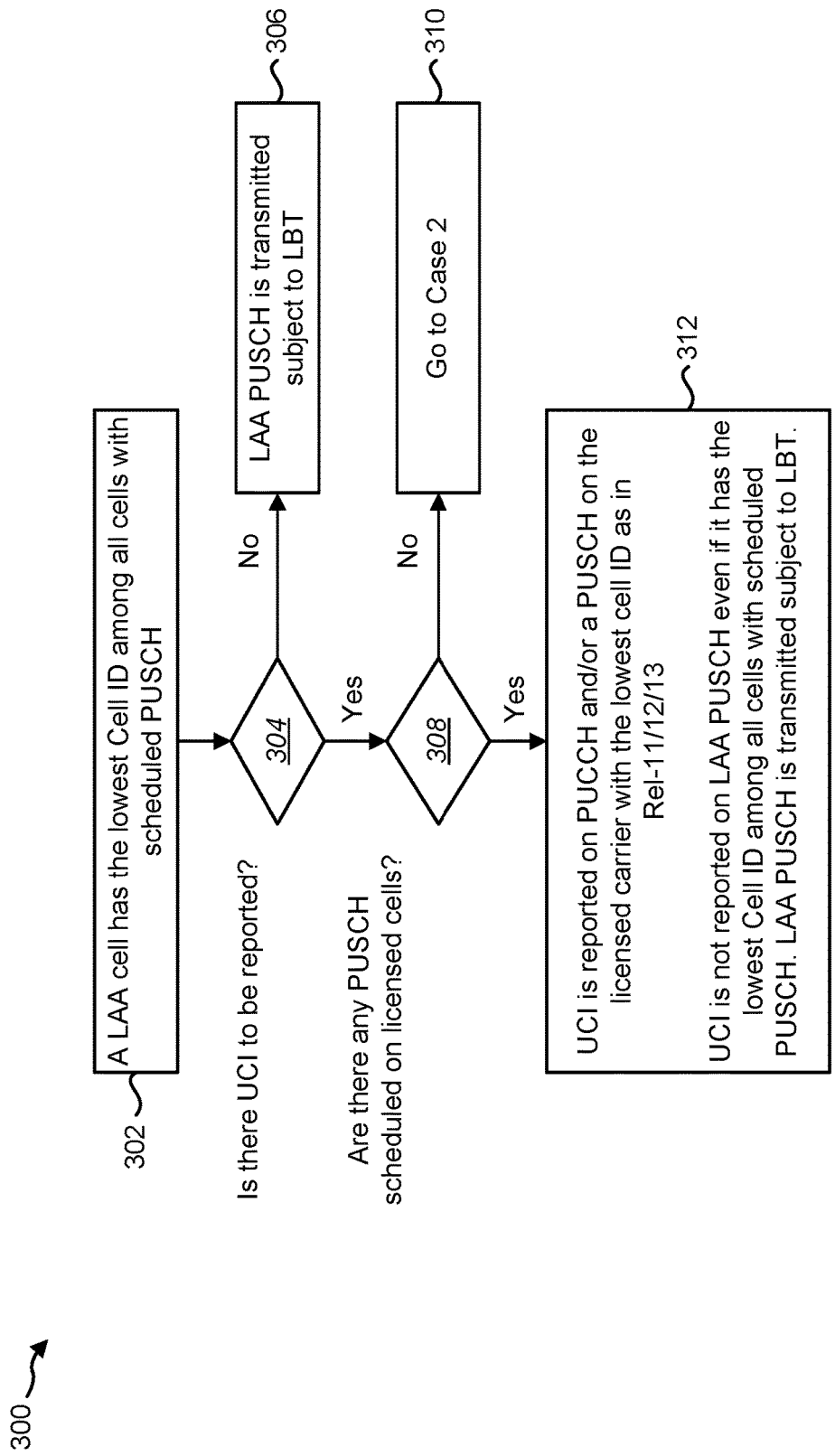
FIG. 3 is a flow diagram illustrating another implementation of a method for reporting UCI when one or more LAA serving cells are configured.

Therefore, in the first case, the UCI may be transmitted on the PUSCH of a licensed cell with the lowest cell ID, even if the cell ID of the PUSCH carrying licensed cell is higher than the cell ID of a LAA cell with scheduled PUSCH transmission. FIG. 3 shows the flow chart for this case.

In this first case, the existing UCI transmissions on PUCCH and PUSCH can be reused. In other words, if simultaneous PUCCH and PUSCH transmission is not configured: HARQ-ACK and/or SR may be transmitted on PUSCH of the licensed cell with lowest cell ID; P-CSI may be transmitted on PUSCH of the licensed cell with lowest cell ID; A-CSI may be transmitted on PUSCH of the licensed cell with lowest cell ID; HARQ-ACK and/or SR+P-CSI may be transmitted on PUSCH of the licensed cell with lowest cell ID; and HARQ-ACK and/or SR+A-CSI may be transmitted on PUSCH of the licensed cell with lowest cell ID.

If simultaneous PUCCH and PUSCH transmission is configured: HARQ-ACK and/or SR may be transmitted on PUCCH; HARQ-ACK and/or SR and P-CSI may be transmitted on PUSCH of the licensed cell with lowest cell ID; and HARQ-ACK and/or SR and A-CSI may be transmitted on PUSCH of the licensed cell with lowest cell ID.

Another approach to avoid Case 1 from happening is to configure all LAA cells with higher cell ID than all licensed cells. Thus, for a UE 102 configured with licensed and LAA cells, the licensed cells are configured with lower cell indexes (Cell IDs) and the LAA cells are configured with higher cell indexes.

Furthermore, the eNB 160 can avoid scheduling LAA PUSCH when there is UCI to be reported, but the scheduling restrictions will lead to inefficient use of LAA resources. As one approach to alleviate the restrictions, a UE 102 that is configured with LAA cells can have default UE 102 capability of simultaneous PUCCH and PUSCH support. Thus, PUCCH may always be available for UCI reporting when LAA cells are configured.

In a second case (Case 2), PUSCH may be scheduled only on LAA cells. This includes a PUSCH on a single LAA cell, or multiple PUSCH on multiple LAA cells. With the current specifications, the UCI may be multiplexed on the PUSCH with the lowest cell ID. Due to its unlicensed nature, LBT is required on each LAA cell. The LAA PUSCH with lowest cell ID is not guaranteed to get channel access.

To avoid dropping of important UCI in this case, the HARQ-ACK and/or SR and/or P-CSI may be reported on PUCCH as if there is no PUSCH scheduled. The LAA PUSCH should be transmitted subject to LBT. Also, the higher layer parameters should be considered.

If simultaneous PUCCH and PUSCH transmission is not configured, with the current specification, all UCI may be transmitted on PUSCH. However, for case 2 where PUSCH is carried only on LAA cells, HARQ-ACK and/or SR and/or P-CSI should be reported on PUCCH and LAA PUSCH should be dropped. The following combinations may be supported: HARQ-ACK and/or SR may be transmitted on PUCCH; P-CSI may be transmitted on PUCCH; and HARQ-ACK and/or SR and P-CSI may be transmitted in the same subframe. If simultaneous HARQ-ACK and CSI is configured, then HARQ-ACK and P-CSI may be transmitted on PUCCH. If simultaneous HARQ-ACK and P-CSI is not configured, then HARQ-ACK may be transmitted on PUCCH and P-CSI may be dropped.

If simultaneous PUCCH and PUSCH transmission is configured, with the current specification, the UCI with higher priority may be reported on PUCCH, and the remaining UCI may be transmitted on PUSCH. For example, if both HARQ-ACK and P-CSI are scheduled, HARQ-ACK is reported on PUCCH and P-CSI is multiplexed on PUSCH. However, for case 2 where PUSCH is carried only on LAA cells, HARQ-ACK and/or SR and/or P-CSI may be reported on PUCCH, and LAA PUSCH may be transmitted subject to LBT.

For case 2, the following combinations may be supported: HARQ-ACK and/or SR may be transmitted on PUCCH; P-CSI may be transmitted on PUCCH; and HARQ-ACK and/or SR and P-CSI may be transmitted in the same subframe. If simultaneous HARQ-ACK and CSI is configured, then HARQ-ACK and P-CSI may be transmitted on PUCCH. If simultaneous HARQ-ACK and P-CSI is not configured, then HARQ-ACK may be transmitted on PUCCH and P-CSI may be dropped.

Alternatively, if simultaneous PUCCH and PUSCH transmission is configured, and HARQ-ACK/SR and P-CSI may be reported in the same subframe, the HARQ-ACK/SR may be protected and reported on PUCCH, the P-CSI may be multiplexed on LAA PUSCH and transmitted subject to LBT regardless the configuration of simultaneous HARQ-ACK and CSI reporting. This may provide better performance for the more important HARQ-ACK/SR while still giving opportunities for P-CSI reporting on LAA PUSCH.

For A-CSI, the UE 102 may multiplex A-CSI on the PUSCH of the given LAA cell corresponding to the CSI request UL grant and may perform LBT for opportunistic transmission. If the UE 102 obtains the channel, it transmits the A-CSI together with PUSCH. If the UE 102 fails to obtain the channel at the scheduled transmission time, the A-CSI is dropped, and no PUSCH is transmitted.

Furthermore, if both P-CSI and A-CSI are scheduled in the same subframe, with the current specification, the P-CSI is dropped and only A-CSI is reported on PUSCH. However, for case 2 where PUSCH is carried only on LAA cells, the A-CSI report on a LAA PUSCH cannot be guaranteed due to LBT process. Therefore, two approaches may be implemented.

In one approach, the same principles described above may be maintained. Thus, P-CSI may be dropped and only A-CSI is reported on LAA PUSCH subject to LBT.

Figure 4:
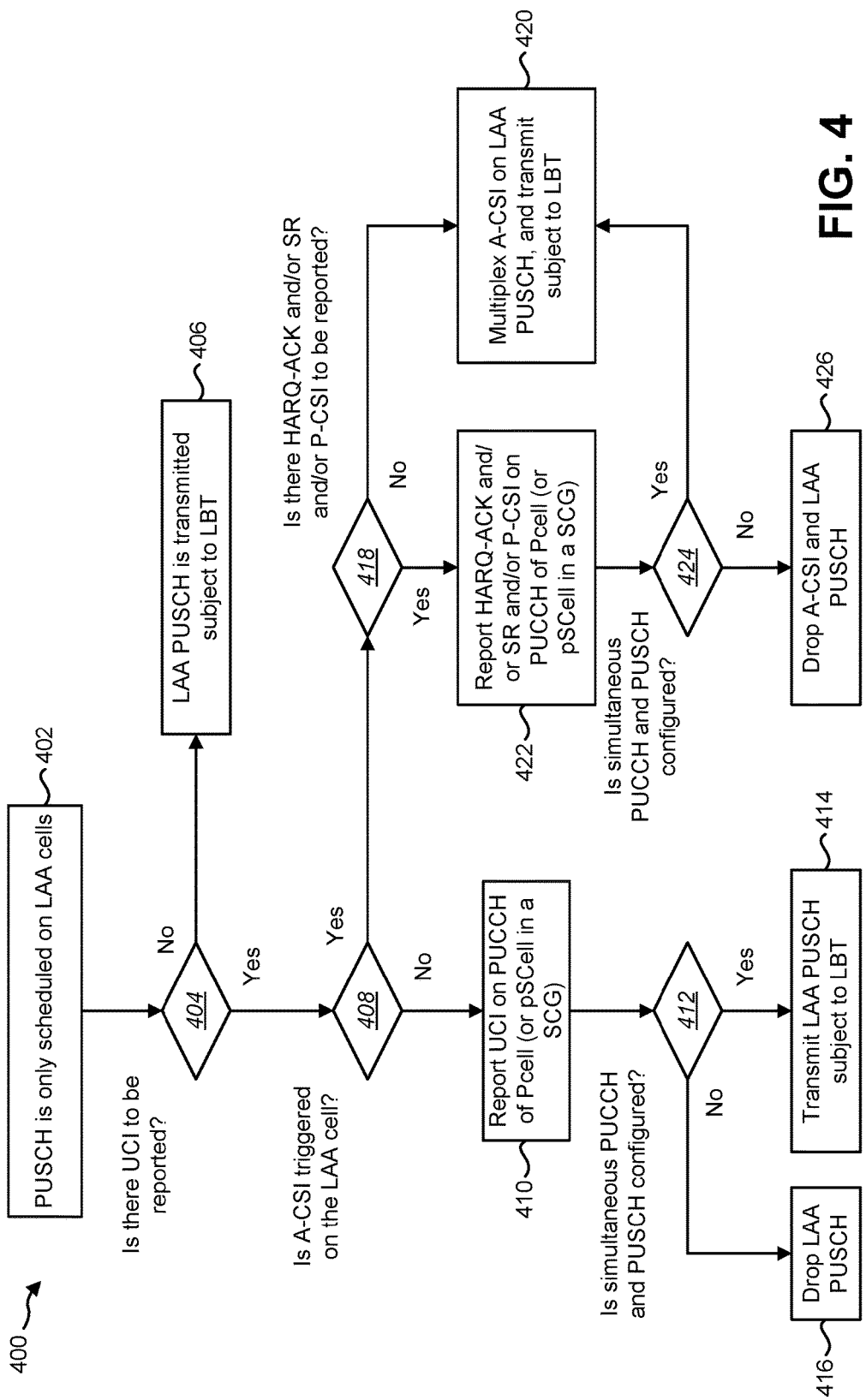
FIG. 4 is a flow diagram illustrating yet another implementation of a method for reporting UCI when one or more LAA serving cells are configured.

In another approach, P-CSI is reported on PUCCH, and A-CSI report depends on the higher layer parameters. If simultaneous PUCCH and PUSCH transmission is not configured, the A-CSI may be dropped, and no PUSCH is transmitted. If simultaneous PUCCH and PUSCH transmission is configured, the A-CSI may be multiplexed on LAA PUSCH and transmitted subject to LBT. FIG. 4 illustrates an example of UCI transmission when PUSCH is only scheduled on LAA cells.

Although a LAA cell may be avoided for important UCI, in some instances, the eNB 160 may prefer to use LAA cell for such reporting. For example, if eNB 160 determines the channel occupancy is low, the eNB 160 may prefer to use LAA cell for UCI reporting. Thus, a higher layer signaling can be used to indicate whether UCI on a LAA cell is allowed. In an implementation, a RRC parameter (such as UCIonLAA, for example) can be configured to indicate whether UCI on a LAA cell is allowed.

If UCI on LAA is not allowed, the above mentioned approaches in case 1 and case 2 may be applied. If UCI on LAA is allowed, the current UCI multiplexing on PUSCH can be reused with LAA PUSCH transmission subject to LBT.

UCI multiplexing on LAA PUSCH may be defined. For UCI multiplexing on PUSCH, several aspects need to be considered. In LTE release 12/13, a control information modulation and coding scheme (MCS) offset is determined by higher layer signaling. An example of control and data multiplexing with normal CP structure is given in example (a) of FIG. 5 below.

The approaches to determine the number of symbols or resource elements (REs) for control multiplexing may be based on a regular UL subframe. In a LAA UL subframe, the number of available OFDM symbols is reduced. Thus, the associated number of resources elements mapped to the PUSCH is also reduced. If the same offset values are used as in regular UL subframe, the number of symbols or REs mapped to the control information is reduced, and the performance and reliability of control information may be degraded. Furthermore, a LAA cell may experience interference from other sources, e.g. hidden terminals. Extra protection may be needed to enhance the reliability of control information.

For example, upon the RRC configuration, DCI format 0 and/or DCI format 4 carried on UE-specific search spaces may include an additional field indicating PUSCH shortening, and the following parameter $N_{symb}^{PUSCH}$ may be used to perform channel interleaving. In an implementation, $N_{symb}^{PUSCH}$ is the number of SC-FDMA symbols in the current PUSCH transmission sub-frame given by $N_{symb}^{PUSCH}=(2 \cdot (N_{symb}^{UL}-1)-N_{SRS}-N_{res})$, where $N_{SRS}$ may be equal to 1 for the following conditions. If these conditions are not met, then $N_{SRS}$ may be equal to 0.

In a first condition, if a UE 102 configured with one UL cell is configured to send PUSCH and SRS in the same subframe for initial transmission, then $N_{SRS}$ may be equal to 1.

In a second condition, if a UE 102 transmits PUSCH and SRS in the same subframe for the current subframe in the same serving cell, then $N_{SRS}$ may be equal to 1.

In a third condition, if the PUSCH resource allocation for the current subframe even partially overlaps with a cell-specific SRS subframe and bandwidth configuration, then $N_{SRS}$ may be equal to 1.

In a fourth condition, if the current subframe in the same serving cell is a UE-specific type-1 SRS subframe, then $N_{SRS}$ may be equal to 1.

In a fifth condition, if the current subframe in the same serving cell is a UE-specific type-0 SRS subframe and the UE 102 is configured with multiple timing advance unit groups (TAGs), then $N_{SRS}$ may be equal to 1.

The parameter $N_{res}$ may be indicated by a PUSCH-shortening field value in the decoded PDCCH/EPDCCH.

Otherwise, $N_{res}$ may be equal to 0. Alternatively, $N_{res}$ may be set to a fixed value (e.g., 1) if the PUSCH-shortening field value in the decoded PDCCH/EPDCCH is set to 1, otherwise $N_{res}$ may be equal to 0.

Figure 5:
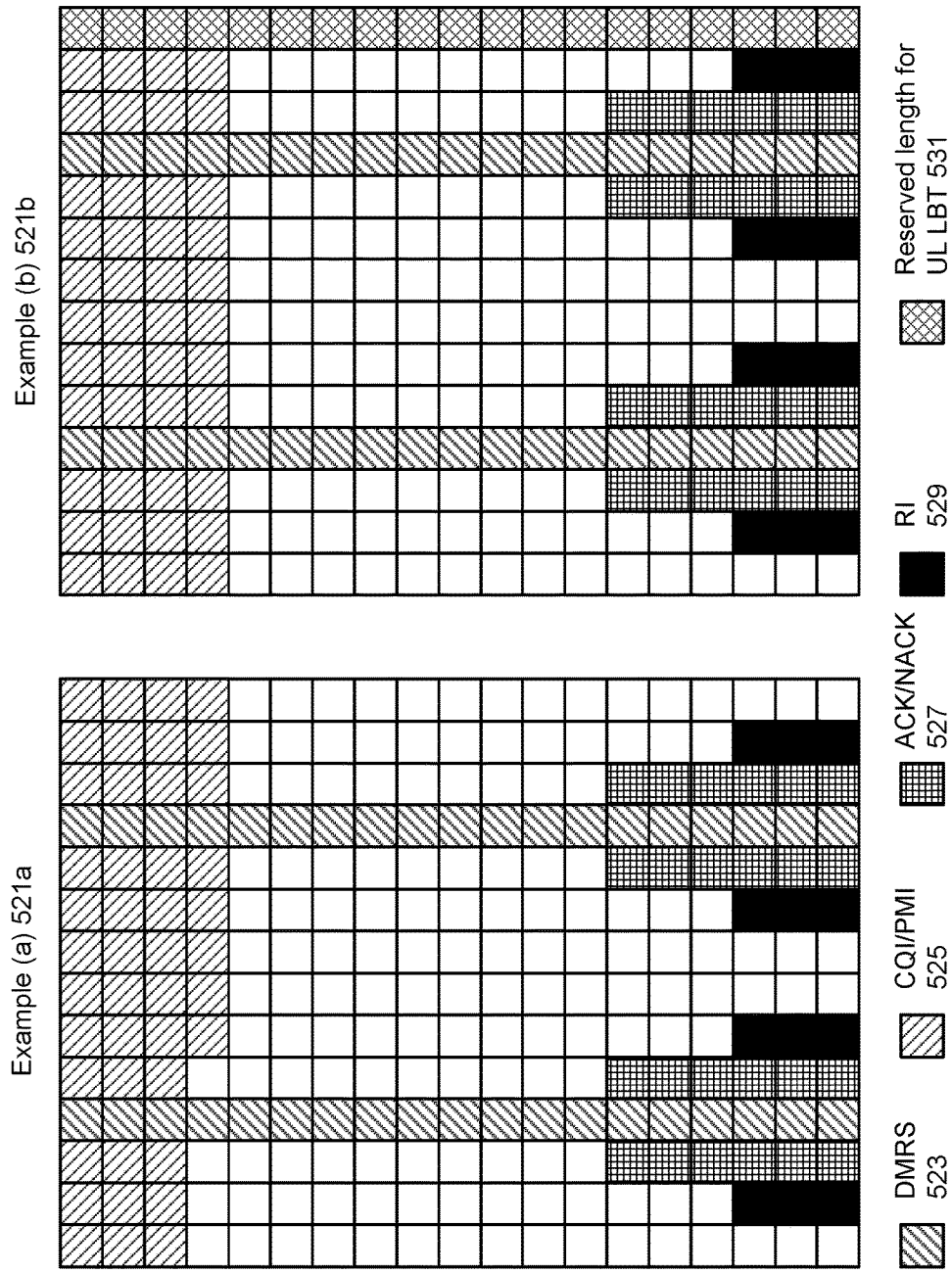
FIG. 5 illustrates examples of control and data multiplexing on a physical uplink shared channel (PUSCH) for a regular cell and a LAA cell.

To overcome this issue, a separate set of offset values may be configured by higher layer signaling (e.g., RRC signaling) to the UE 102 for LAA cell control multiplexing. Furthermore, the control information symbols may be mapped to only OFDM symbols available in a LAA UL subframe. For example, if the LAA UL has only 13 OFDM symbols instead of 14 as in regular UL subframe, the coded CSI symbols may be mapped to 13 OFDM symbols instead of mapping to 14 OFDM symbols then puncture out one OFDM symbol. Example (b) of FIG. 5 shows an example of adjusted CSI mapping assuming the same number of REs as in example (a) of FIG. 5.

Therefore, for a LAA cell, separate offset values may be defined for single codeword PUSCH transmission and multiple codeword PUSCH transmission. Single codeword PUSCH transmission offsets $\beta_{offset}^{HARQ-ACK}$, $\beta_{offset}^{RI}$ and $\beta_{offset}^{CQI}$ may be configured to values according to Table (1), Table (2) and Table (3) with the higher layer signaled indexes $I_{offset}^{HARQ-ACK}$, $I_{offset}^{RI}$ and $I_{offset}^{CQI}$, respectively. Multiple codeword PUSCH transmission offsets $\beta_{offset}^{HARQ-ACK}$, $\beta_{offset}^{RI}$ and $\beta_{offset}^{CQI}$ may be configured to values according to Table 8.6.3-1,2,3 with the higher layer signaled indexes $I_{offset,MC}^{HARQ-ACK}$, $I_{offset,MC}^{RI}$ and $I_{offset,MC}^{CQI}$, respectively.

Table (1) provides a mapping of HARQ-ACK offset values and the index signaled by higher layers.

TABLE 1

| $I_{offset}^{HARQ-ACK}$ or $I_{offset,MC}^{HARQ-ACK}$ | $\beta_{offset}^{HARQ-ACK}$ |
|---|---|
| 0 | 2.000 |
| 1 | 2.500 |
| 2 | 3.125 |
| 3 | 4.000 |
| 4 | 5.000 |
| 5 | 6.250 |
| 6 | 8.000 |
| 7 | 10.000 |
| 8 | 12.625 |
| 9 | 15.875 |
| 10 | 20.000 |
| 11 | 31.000 |
| 12 | 50.000 |
| 13 | 80.000 |
| 14 | 126.000 |
| 15 | 1.0 |

Table (2) provides a mapping of RI offset values and the index signaled by higher layers.

TABLE 2

| $I_{offset}^{RI}$ or $I_{offset,MC}^{RI}$ | $\beta_{offset}^{RI}$ |
|---|---|
| 0 | 1.250 |
| 1 | 1.625 |
| 2 | 2.000 |
| 3 | 2.500 |
| 4 | 3.125 |
| 5 | 4.000 |
| 6 | 5.000 |
| 7 | 6.250 |
| 8 | 8.000 |
| 9 | 10.000 |
| 10 | 12.625 |
| 11 | 15.875 |
| 12 | 20.000 |
| 13 | reserved |
| 14 | reserved |
| 15 | reserved |

Table (3) provides a mapping of CQI offset values and the index signaled by higher layers.

TABLE 3

| $I_{offset}^{CQI}$ or $I_{offset,MC}^{CQI}$ | $\beta_{offset}^{CQI}$ |
|---|---|
| 0 | reserved |
| 1 | reserved |
| 2 | 1.125 |
| 3 | 1.250 |
| 4 | 1.375 |
| 5 | 1.625 |
| 6 | 1.750 |
| 7 | 2.000 |
| 8 | 2.250 |
| 9 | 2.500 |
| 10 | 2.875 |
| 11 | 3.125 |
| 12 | 3.500 |
| 13 | 4.000 |
| 14 | 5.000 |
| 15 | 6.250 |

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the eNB 160.

The UE operations module 124 may provide information 136 to the decoder 108. For example, the UE operations module 124 may inform the decoder 108 of an anticipated encoding for transmissions from the eNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the eNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the eNB 160. For instance, the one or more transmitters 158 may transmit during a UL subframe. The one or more transmitters 158 may upconvert and transmit the modulated signal(s) 156 to one or more eNBs 160.

The eNB 160 may include one or more transceivers 176, one or more demodulators 172, one or more decoders 166, one or more encoders 109, one or more modulators 113, a data buffer 162 and an eNB operations module 182. For example, one or more reception and/or transmission paths may be implemented in an eNB 160. For convenience, only a single transceiver 176, decoder 166, demodulator 172, encoder 109 and modulator 113 are illustrated in the eNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180 a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The eNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the eNB operations module 182 to perform one or more operations.

In general, the eNB operations module 182 may enable the eNB 160 to communicate with the one or more UEs 102. The eNB operations module 182 may include one or more of an eNB UCI reporting module 194.

The eNB UCI reporting module 194 may receive the channel on the cells determined to carry UCI from the UE 102. For HARQ-ACK/SR and periodic CSI (including CQI and/or PMI and/or RI), If HARQ-ACK/SR/P-CSI is scheduled in a subframe where an LAA cell is the only cell with a PUSCH transmission, the CSI may be received on the PUCCH of the PCell or pSCell.

If HARQ-ACK/SR/P-CSI is scheduled in a subframe where an LAA cell is the cell with lowest Cell ID and there is a PUSCH transmission, if the other cells with PUSCH are also LAA cells, the CSI may be received on the PUCCH of the PCell or pSCell. If there is another licensed cell with PUSCH transmission, the UCI may be multiplexed on the licensed cell even if it has a higher Cell ID index.

For aperiodic CSI, the reporting cell may be determined by the triggering UL grant. Thus, if a LAA cell is scheduled to report A-CSI, the UE 102 should perform LAA UL transmission subject to LBT. Thus, if the UE 102 fails to obtain the channel at the given subframe with LBT, the A-CSI may be dropped. If the UE 102 obtains the channel with LBT, the A-CSI should be received on the LAA UL PUSCH. However, the beta offset values may be different from a regular UL subframe PUSCH transmission because the LAA UL subframe contains fewer OFDM symbols. Also, the rate matching methods should be adjusted according to the number of OFDM symbols on the LAA PUSCH transmission.

The eNB operations module 182 may provide information 190 to the one or more receivers 178. For example, the eNB operations module 182 may inform the receiver(s) 178 when or when not to receive UCI.

The eNB operations module 182 may provide information 188 to the demodulator 172. For example, the eNB operations module 182 may inform the demodulator 172 of a modulation pattern anticipated for transmissions from the UE(s) 102.

The eNB operations module 182 may provide information 186 to the decoder 166. For example, the eNB operations module 182 may inform the decoder 166 of an anticipated encoding for transmissions from the UE(s) 102.

The eNB operations module 182 may provide information 101 to the encoder 109. The information 101 may include data to be encoded and/or instructions for encoding. For example, the eNB operations module 182 may instruct the encoder 109 to encode transmission data 105 and/or other information 101.

The encoder 109 may encode transmission data 105 and/or other information 101 provided by the eNB operations module 182. For example, encoding the data 105 and/or other information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The eNB operations module 182 may provide information 103 to the modulator 113. This information 103 may include instructions for the modulator 113. For example, the eNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The eNB operations module 182 may provide information 192 to the one or more transmitters 117. This information 192 may include instructions for the one or more transmitters 117. For example, the eNB operations module 182 may instruct the one or more transmitters 117 when to (or when not to) transmit a signal to the UE(s) 102. In some implementations, this may be based on the UCI. The one or more transmitters 117 may upconvert and transmit the modulated signal(s) 115 to one or more UEs 102.

It should be noted that a DL subframe may be transmitted from the eNB 160 to one or more UEs 102 and that a UL subframe may be transmitted from one or more UEs 102 to the eNB 160. Furthermore, both the eNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
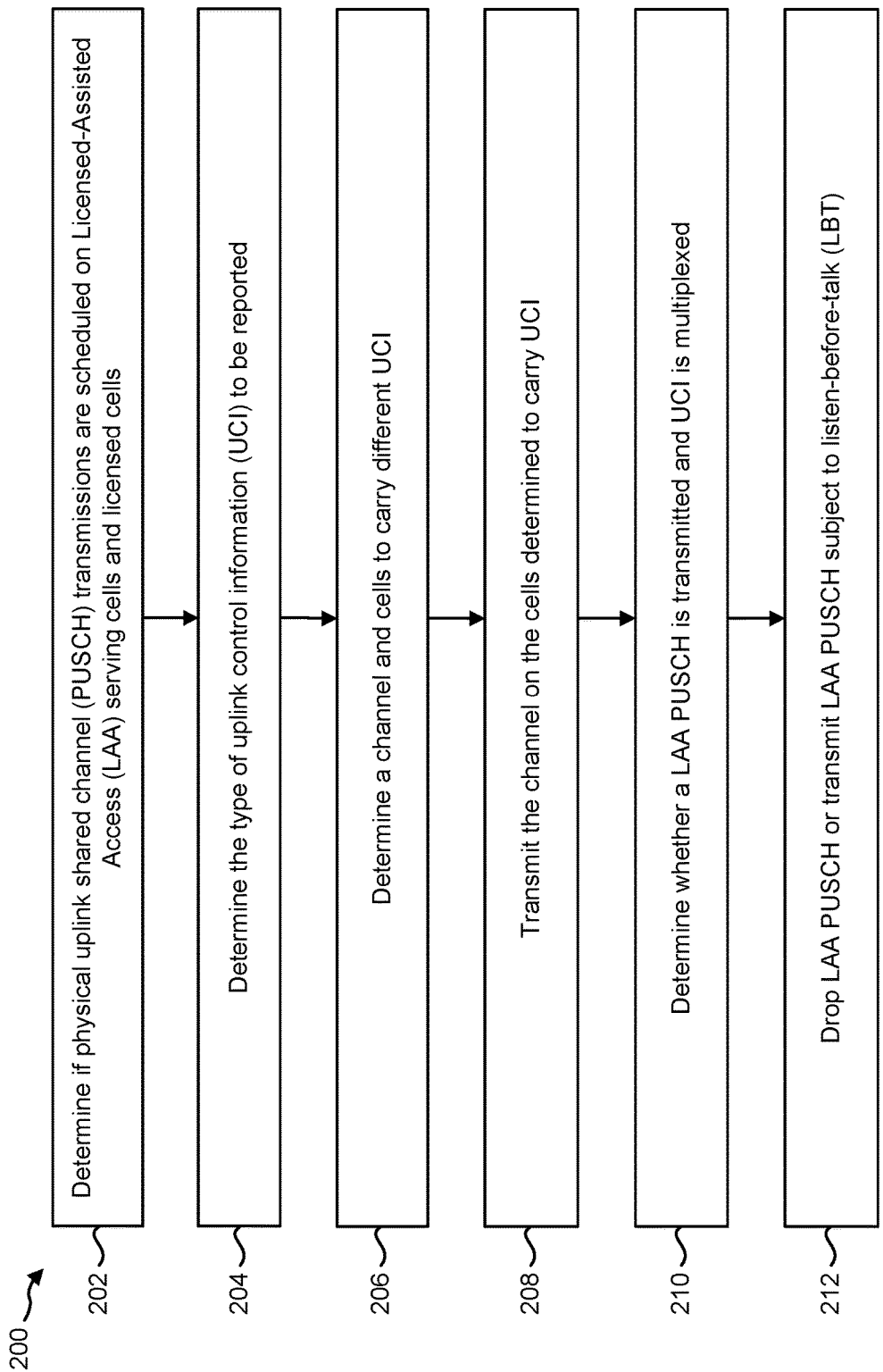
FIG. 2 is a flow diagram illustrating one implementation of a method for reporting UCI when one or more LAA serving cells are configured.

FIG. 2 is a flow diagram illustrating one implementation of a method 200 for reporting UCI when one or more LAA serving cells are configured. The method 200 may be implemented by a UE 102. The UE 102 may communicate with one or more eNBs 160 in a wireless communication network. In one implementation, the wireless communication network may include an LTE network.

The term LAA serving cell may be defined as a serving cell configured with Frame structure type 3, which is different from either Frame structure type 1 or 2, where Frame structure type 1 is applicable to FDD and Frame structure type 2 is applicable to TDD with TDD DL-UL configurations 0-6. Alternatively, LAA serving cell may be defined as a serving cell configured for which an RRC bit field indicates that the concerned serving cell is an assisted serving cell. Yet alternatively, LAA serving cell may be defined as a serving cell configured with a LAA-specific functionality such as Received Signal Strength Indicator (RSSI) reporting, RSSI measurement timing configuration (RMTC), Discovery reference signal (DRS) with less than 1 ms DRS occasion. Yet alternatively, LAA serving cell may be defined as a serving cell of which Evolved Universal Terrestrial Radio Access (EUTRA) Absolute Radio-Frequency Channel Number (EARFCN) indicates an unlicensed band (e.g. 5150-5925 MHz band). In contrast, a licensed serving cell may be defined as a serving cell that does not fulfill the above-described LAA serving cell definitions.

The UE 102 may determine 202 if physical uplink shared channel (PUSCH) transmissions are scheduled on LAA serving cells and licensed cells. A long-term evolution (LTE) uplink (UL) transmission may be scheduled by an eNB 160 with an uplink grant. An UL grant may be a downlink control information (DCI) format in a PDCCH, an EPDCCH or a PHICH feedback.

In one case, the UE 102 may determine 202 that PUSCH transmissions are scheduled on LAA serving cells and licensed cells. In another case, the UE 102 may determine 202 that PUSCH transmissions are scheduled only on LAA serving cells.

The UE 102 may determine 204 the type of UCI to be reported. The UCI may include HARQ-ACK feedback for PDSCH transmissions. UCI may also include a scheduling request (SR) when a UE 102 has UL data and requests for eNB 160 to schedule a UL transmission. UCI may further include periodic channel state information (P-CSI), including CQI, PMI and RI, which is configured by the eNB 160 to report periodically. UCI may additionally include aperiodic channel state information (A-CSI), including CQI, PMI and RI, which is triggered by the eNB 160 to report CSI based on CSI request field.

The UE 102 may determine 206 a channel and cells to carry different UCI. The UE 102 may select one of a PUCCH or PUSCH to report the UCI. Furthermore, the UE 102 may select either the LAA cell or the licensed cell. This may be accomplished as described in connection with FIG. 1. The UE 102 may transmit 208 the channel on the cells determined to carry UCI.

The UE 102 may determine 210 whether a LAA PUSCH is transmitted and UCI is multiplexed. If simultaneous PUCCH and PUSCH is not configured, then the UE 102 may drop 212 LAA PUSCH. If simultaneous PUCCH and PUSCH is configured, then the UE 102 may transmit 212 LAA PUSCH subject to listen-before-talk (LBT).

FIG. 3 is a flow diagram illustrating another implementation of a method 300 for reporting UCI when one or more LAA serving cells are configured. The method 300 may be implemented by a UE 102. The UE 102 may communicate with one or more eNBs 160 in a wireless communication network. In one implementation, the wireless communication network may include an LTE network.

The example illustrated in FIG. 3 corresponds to Case 1 described above, where PUSCH transmissions are scheduled on both LAA and licensed cells. The UE 102 may determine 302 that a LAA cell has the lowest Cell ID among all cells with scheduled PUSCH.

The UE 102 may determine 304 whether there is UCI to be reported. The UCI may include HARQ-ACK feedback for PDSCH transmissions, SR, P-CSI, and/or A-CSI. If there is no UCI to be reported, the UE 102 may transmit 306 the LAA PUSCH subject to LBT.

If the UE 102 determines 304 that there is UCI to be reported, the UE 102 may determine 308 whether there are any PUSCH scheduled on licensed cells. If there are no PUSCH scheduled on licensed cells, then the UE 102 may go 310 to Case 2, as described in connection with FIG. 4.

If the UE 102 determines 308 that there are PUSCH scheduled on the licensed cells, then the UE 102 may report 312 on PUCCH and/or a PUSCH on the licensed carrier with the lowest cell ID as in Release-11/12/13. In this case, UCI is not reported on LAA PUSCH even if it has the lowest Cell ID among all cells with scheduled PUSCH. LAA PUSCH is transmitted subject to LBT.

FIG. 4 is a flow diagram illustrating yet another implementation of a method 400 for reporting UCI when one or more LAA serving cells are configured. The method 400 may be implemented by a UE 102. The UE 102 may communicate with one or more eNBs 160 in a wireless communication network. In one implementation, the wireless communication network may include an LTE network.

The example illustrated in FIG. 4 corresponds to Case 2 described above. In this case, the UE 102 may determine 402 that PUSCH is only scheduled on LAA cells. This includes a PUSCH on a single LAA cell, or multiple PUSCH on multiple LAA cells.

The UE 102 may determine 404 whether there is UCI to be reported. If there is no UCI to be reported, then the UE 102 may transmit 406 the LAA PUSCH subject to LBT.

If the UE 102 determines 404 that there is UCI to be reported, then the UE 102 may determine 408 whether there is A-CSI triggered on the LAA cell. If there is no A-CSI triggered on the LAA cell, then the UE 102 may report 410 UCI on a PUCCH of a Pcell or a pSCell in an SCG.

The UE 102 may determine 412 whether simultaneous PUCCH and PUSCH is configured. If simultaneous PUCCH and PUSCH is configured, then the UE 102 may transmit 414 a LAA PUSCH subject to LBT. If simultaneous PUCCH and PUSCH is not configured, then the UE 102 may drop 416 the LAA PUSCH.

If the UE 102 determines 408 that there is A-CSI triggered on the LAA cell, then the UE 102 may determine 418 whether there is HARQ-ACK and/or SR and/or P-CSI to be reported. If there is no HARQ-ACK and/or SR and/or P-CSI to be reported, then the UE 102 may multiplex 420 A-CSI on LAA PUSCH and transmit subject to LBT.

If the UE 102 determines 418 that there is HARQ-ACK and/or SR and/or P-CSI to be reported, then the UE 102 may report 422 the HARQ-ACK and/or SR and/or P-CSI on PUCCH of the Pcell or the PSCell in a SCG. The UE 102 may determine 424 whether simultaneous PUCCH and PUSCH is configured. If simultaneous PUCCH and PUSCH is configured, then the UE 102 may multiplex 420 A-CSI on LAA PUSCH and transmit subject to LBT. If simultaneous PUCCH and PUSCH is not configured, then the UE 102 may drop 426 A-CSI and LAA PUSCH.

It should be noted that for the case where both P-CSI and A-CSI are scheduled in the same subframe, with the current specifications with licensed carrier, only the A-CSI is multiplexed on a PUSCH and P-CSI is dropped. With the approaches described herein, P-CSI may be reported on PUCCH because the LAA PUSCH cannot be guaranteed. Furthermore, if simultaneous PUCCH and PUSCH is configured, A-CSI may be multiplexed on a LAA PUSCH and is transmitted subject to LBT.

FIG. 5 illustrates examples of control and data multiplexing on PUSCH for a regular cell and a LAA cell. Example (a) 521a corresponds to a regular cell. Example (b) 521b corresponds to a LAA cell. In these examples, the DMRS 523, CQI/PMI 525, ACK/NACK 527 and RI 529 are depicted according to resource elements (REs) (e.g., OFDM symbols). Example (b) 521b further depicts reserved length REs 531 for UL LBT.

Example (b) 521b of FIG. 5 shows an example of adjusted CSI mapping assuming the same number of REs as in example (a) 521a. If the LAA UL has only 13 OFDM symbols instead of 14 as in regular UL subframe, the coded CSI symbols may be mapped to 13 OFDM symbols instead of mapping to 14 OFDM symbols. Then one OFDM symbol may be punctured out.

Figure 6:
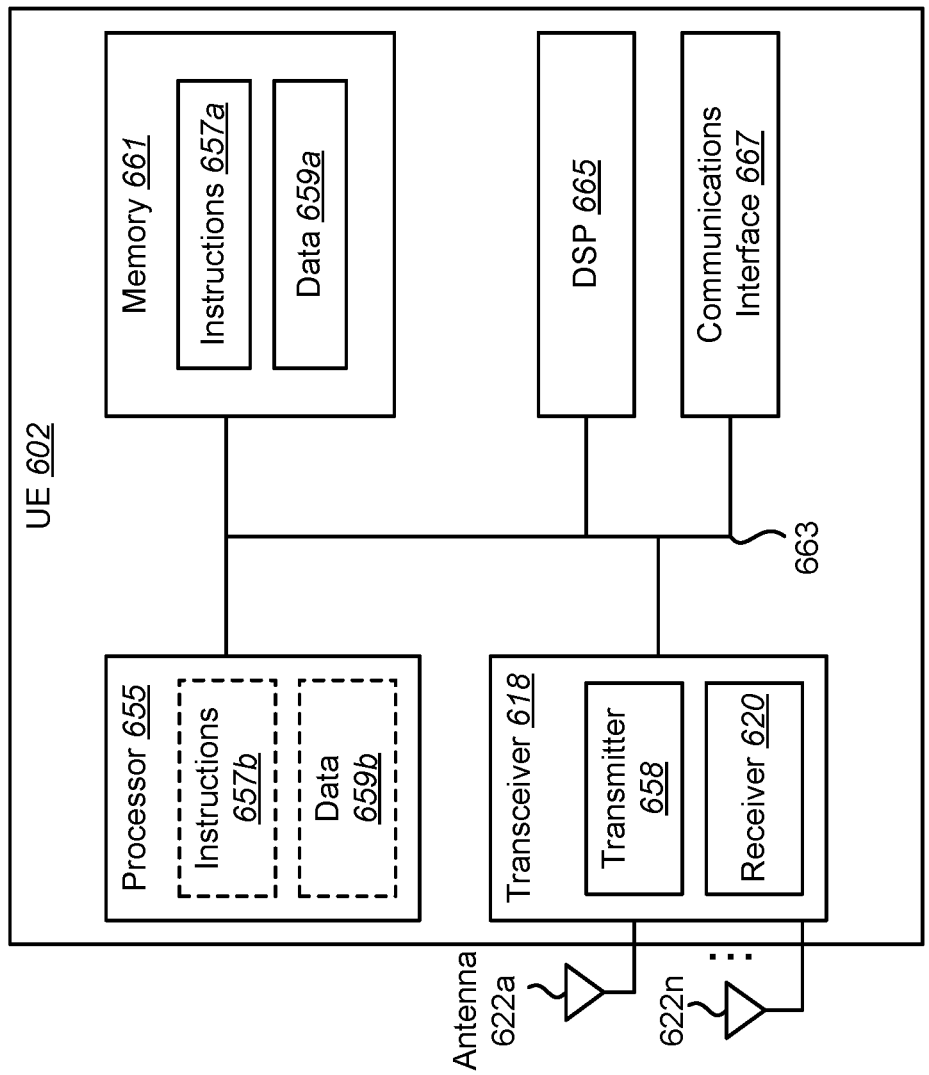
FIG. 6 illustrates various components that may be utilized in a UE.

FIG. 6 illustrates various components that may be utilized in a UE 602. The UE 602 described in connection with FIG. 6 may be implemented in accordance with the UE 102 described in connection with FIG. 1. The UE 602 includes a processor 655 that controls operation of the UE 602. The processor 655 may also be referred to as a central processing unit (CPU). Memory 661, which may include read-only memory (ROM), random access memory (RAM), a combination of the two or any type of device that may store information, provides instructions 657a and data 659a to the processor 655. A portion of the memory 661 may also include non-volatile random access memory (NVRAM). Instructions 657b and data 659b may also reside in the processor 655. Instructions 657b and/or data 659b loaded into the processor 655 may also include instructions 657a and/or data 659a from memory 661 that were loaded for execution or processing by the processor 655. The instructions 657b may be executed by the processor 655 to implement one or more of the method 200, 300 and 400 described above.

The UE 602 may also include a housing that contains one or more transmitters 658 and one or more receivers 620 to allow transmission and reception of data. The transmitter(s) 658 and receiver(s) 620 may be combined into one or more transceivers 618. One or more antennas 622a-n are attached to the housing and electrically coupled to the transceiver 618.

The various components of the UE 602 are coupled together by a bus system 663, which may include a power bus, a control signal bus and a status signal bus, in addition to a data bus. However, for the sake of clarity, the various buses are illustrated in FIG. 6 as the bus system 663. The UE 602 may also include a digital signal processor (DSP) 665 for use in processing signals. The UE 602 may also include a communications interface 667 that provides user access to the functions of the UE 602. The UE 602 illustrated in FIG. 6 is a functional block diagram rather than a listing of specific components.

Figure 7:
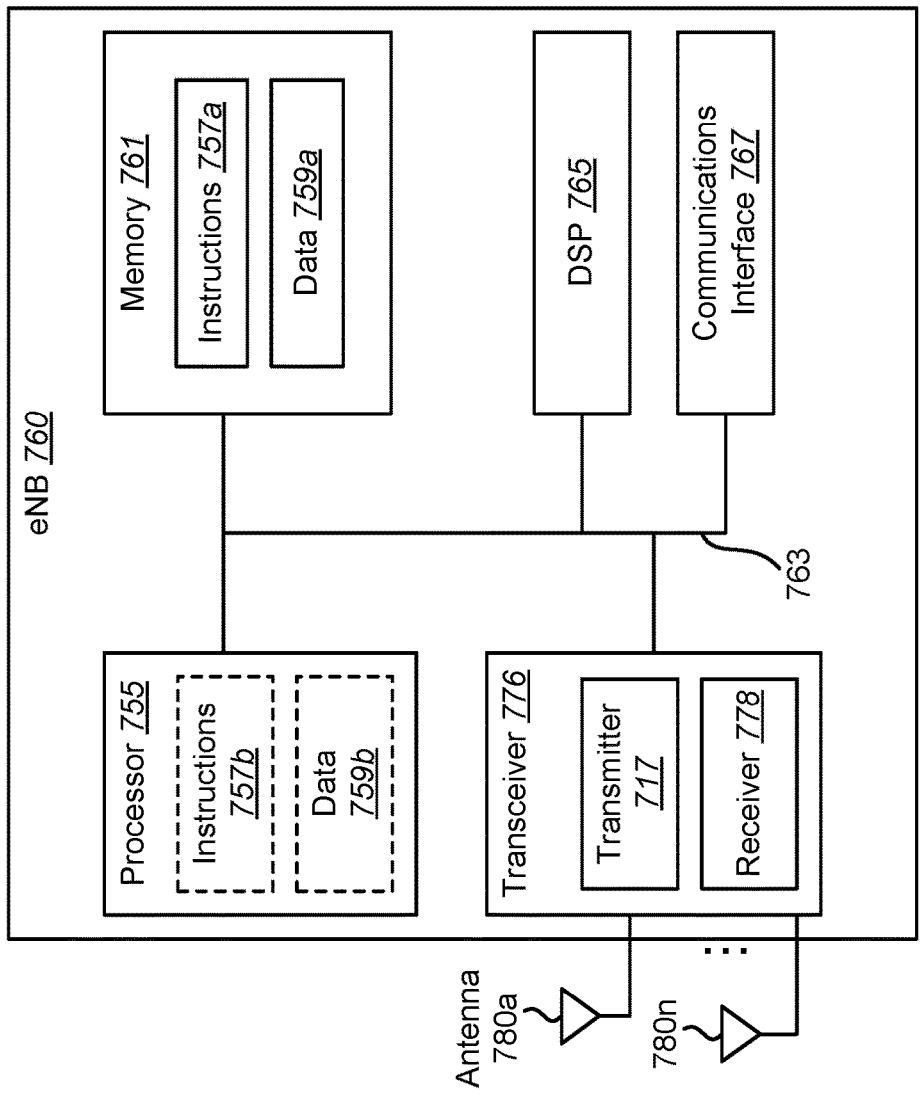
FIG. 7 illustrates various components that may be utilized in an eNB.

FIG. 7 illustrates various components that may be utilized in an eNB 760. The eNB 760 described in connection with FIG. 7 may be implemented in accordance with the eNB 160 described in connection with FIG. 1. The eNB 760 includes a processor 755 that controls operation of the eNB 760. The processor 755 may also be referred to as a central processing unit (CPU). Memory 761, which may include read-only memory (ROM), random access memory (RAM), a combination of the two or any type of device that may store information, provides instructions 757a and data 759a to the processor 755. A portion of the memory 761 may also include non-volatile random access memory (NVRAM). Instructions 757b and data 759b may also reside in the processor 755. Instructions 757b and/or data 759b loaded into the processor 755 may also include instructions 757a and/or data 759a from memory 761 that were loaded for execution or processing by the processor 755. The instructions 757b may be executed by the processor 755 to implement one or more of the method described above.

The eNB 760 may also include a housing that contains one or more transmitters 717 and one or more receivers 778 to allow transmission and reception of data. The transmitter(s) 717 and receiver(s) 778 may be combined into one or more transceivers 776. One or more antennas 780a-n are attached to the housing and electrically coupled to the transceiver 776.

The various components of the eNB 760 are coupled together by a bus system 763, which may include a power bus, a control signal bus and a status signal bus, in addition to a data bus. However, for the sake of clarity, the various buses are illustrated in FIG. 7 as the bus system 763. The eNB 760 may also include a digital signal processor (DSP) 765 for use in processing signals. The eNB 760 may also include a communications interface 767 that provides user access to the functions of the eNB 760. The eNB 760 illustrated in FIG. 7 is a functional block diagram rather than a listing of specific components.

Figure 8:
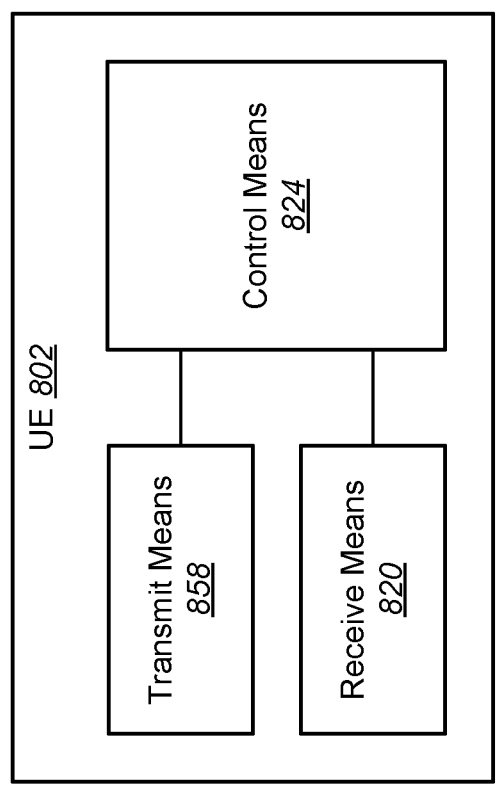
FIG. 8 is a block diagram illustrating one configuration of a UE in which systems and methods for performing carrier aggregation may be implemented.

FIG. 8 is a block diagram illustrating one implementation of a UE 802 in which systems and methods for performing carrier aggregation may be implemented. The UE 802 includes transmit means 858, receive means 820 and control means 824. The transmit means 858, receive means 820 and control means 824 may be configured to perform one or more of the functions described in connection with Figures above. FIG. 6 above illustrates one example of a concrete apparatus structure of FIG. 8. Other various structures may be implemented to realize one or more of the functions of the Figures. For example, a DSP may be realized by software.

Figure 9:
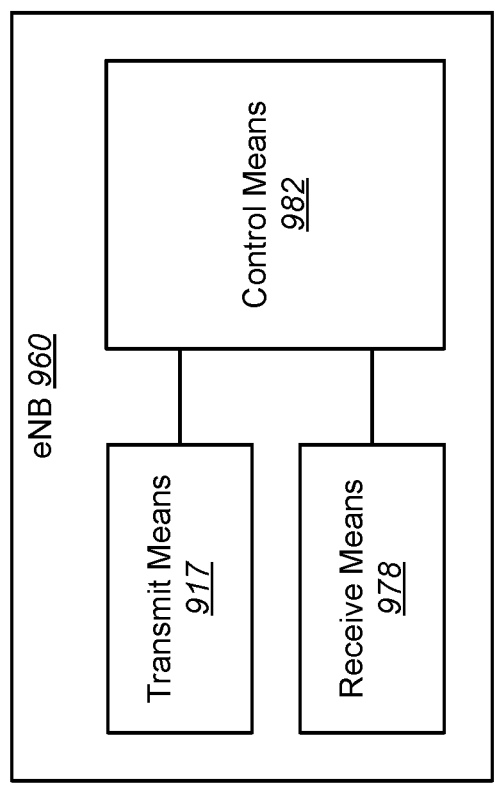
FIG. 9 is a block diagram illustrating one configuration of an eNB in which systems and methods for performing carrier aggregation may be implemented.

FIG. 9 is a block diagram illustrating one implementation of an eNB 960 in which systems and methods for performing carrier aggregation may be implemented. The eNB 960 includes transmit means 917, receive means 978 and control means 982. The transmit means 917, receive means 978 and control means 982 may be configured to perform one or more of the functions described in connection with Figures above. FIG. 7 above illustrates one example of a concrete apparatus structure of FIG. 9. Other various structures may be implemented to realize one or more of the functions of the Figures above. For example, a DSP may be realized by software.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the eNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the eNB 160 and the UE 102 according to the systems and methods described above may be realized as an LSI that is a typical integrated circuit. Each functional block of the eNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

What is claimed is:

1. A user equipment (UE) comprising:
 a processor; and
 a memory in electronic communication with the processor, wherein instructions stored in the memory are executable by the processor to:
  in a case of an uplink control information (UCI) transmission in a subframe with physical uplink shared channel(s) (PUSCH(s)) and if an aperiodic channel state information (CSI) report is not triggered for the subframe, and if the PUSCH(s) is transmitted only on Licensed-Assisted Access (LAA) secondary cell(s) (SCell(s)), follow a UCI transmission procedure for cases of UCI transmission in a subframe without PUSCH, wherein the UCI includes a periodic CSI report and a hybrid automatic repeat request acknowledgement (HARQ-ACK), and the UCI transmission procedure is a procedure in which the UCI is transmitted on a physical uplink control channel (PUCCH).

2. The UE of claim 1, wherein the instructions are further executable to: in a case that the PUSCH(s) are transmitted on both the LAA SCell(s) and non-LAA SCell(s) and if simultaneous PUCCH and PUSCH transmission is not configured, transmit the UCI on PUSCH of a non-LAA SCell with a smallest ID.

3. An evolved node B (eNB) comprising:
 a processor; and
 a memory in electronic communication with the processor, wherein instructions stored in the memory are executable by the processor to:
  in a case of an uplink control information (UCI) transmission in a subframe with physical uplink shared channel(s) (PUSCH(s)) and if an aperiodic channel state information (CSI) report is not triggered for the subframe, and if the PUSCH(s) is transmitted only on Licensed-Assisted Access (LAA) secondary cell(s) (SCell(s)), follow a UCI reception procedure for cases of UCI transmission in a subframe without PUSCH, wherein the UCI includes a periodic CSI report and a hybrid automatic repeat request acknowledgement (HARQ-ACK), and the UCI reception procedure is a procedure in which the UCI is received on a physical uplink control channel (PUCCH).

4. The eNB of claim 3, wherein the instructions are further executable to: in a case that the PUSCH(s) are transmitted on both the LAA SCell(s) and non-LAA SCell(s) and if simultaneous PUCCH and PUSCH transmission is not configured, receive the UCI on PUSCH of a non-LAA SCell with a smallest ID.

\* \* \* \* \*